US007578319B2

(12) United States Patent
Behar et al.

(10) Patent No.: US 7,578,319 B2
(45) Date of Patent: Aug. 25, 2009

(54) FLUID DISPENSER AND A METHOD OF ASSEMBLING SUCH A DISPENSER

(75) Inventors: Alain Behar, Suresnes (FR); Laurent Decottignies, Cergy (FR)

(73) Assignee: Airlesssystems, Charleval (FR)

( * ) Notice: Subject to any disclaimer, the term of this patent is extended or adjusted under 35 U.S.C. 154(b) by 36 days.

(21) Appl. No.: 10/556,890

(22) PCT Filed: May 17, 2004

(86) PCT No.: PCT/FR2004/001210

§ 371 (c)(1),
(2), (4) Date: Sep. 13, 2006

(87) PCT Pub. No.: WO2004/105960

PCT Pub. Date: Dec. 9, 2004

(65) Prior Publication Data

US 2007/0068593 A1 Mar. 29, 2007

(30) Foreign Application Priority Data

May 26, 2003 (FR) .................................. 03 06351

(51) Int. Cl.
*B65B 3/04* (2006.01)
*B65B 3/18* (2006.01)
*B67B 7/28* (2006.01)
*G01F 11/00* (2006.01)

(52) U.S. Cl. .............................. 141/2; 141/5; 222/256; 222/321.7; 53/471

(58) Field of Classification Search ................. 141/4-7, 141/21-23, 25-27, 2; 222/386, 386.5, 256-258, 222/321.7, 321.9, 389; 53/467, 469, 471
See application file for complete search history.

(56) References Cited

U.S. PATENT DOCUMENTS 4,685,594 A * 8/1987 Czech ........................ 222/182
4,817,829 A * 4/1989 Fuchs et al. .................. 141/27
5,085,350 A * 2/1992 Sugita ........................ 222/260
5,104,004 A * 4/1992 von Schuckmann ......... 222/135
5,237,797 A * 8/1993 Varlet ......................... 53/420

(Continued)

FOREIGN PATENT DOCUMENTS

EP 0 486 355 A1 5/1992

(Continued)

*Primary Examiner*—Timothy L Maust
*Assistant Examiner*—Nicolas A Arnett
(74) *Attorney, Agent, or Firm*—Sughrue Mion, PLLC

(57) ABSTRACT

A method of assembling a fluid dispenser comprising: a dispenser member (2), such as a pump, the member including an inlet tube (22; 61) in which there extends an inlet for admitting fluid into the dispenser member; a reservoir (10) for containing fluid, said reservoir comprising a cylinder (11; 11') and a follower-piston (14) that is slidably mounted in said cylinder; and an annular dish (32; 32') presenting an outer periphery (33) that is secured to the cylinder (11; 11'), and an inner periphery (321) defining an opening (20) of section that is small relative to the cylinder, the working volume of the reservoir (10) being defined between the dish (32; 32') and the follower-piston (14) over a height of the cylinder, the method including the successive steps of: filling the reservoir (10) with fluid; and engaging the tube (22) in leaktight manner in the opening.

11 Claims, 8 Drawing Sheets

U.S. PATENT DOCUMENTS

| | | | | | |
|---|---|---|---|---|---|
| 5,292,033 | A | * | 3/1994 | Gueret | 222/95 |
| 5,370,272 | A | * | 12/1994 | Gueret | 222/95 |
| 5,449,094 | A | * | 9/1995 | Behar et al. | 222/321.3 |
| 5,509,584 | A | | 4/1996 | Gueret | |
| 5,548,943 | A | * | 8/1996 | Behar et al. | 53/473 |
| RE35,683 | E | * | 12/1997 | Varlet | 53/420 |
| 6,227,414 | B1 | * | 5/2001 | Peronnet et al. | 222/207 |
| 6,240,979 | B1 | * | 6/2001 | Lorscheidt | 141/2 |
| RE38,077 | E | * | 4/2003 | Cohen et al. | 239/333 |
| 2003/0102329 | A1 | * | 6/2003 | Ki | 222/129 |

FOREIGN PATENT DOCUMENTS

| | | | |
|---|---|---|---|
| EP | 0 499 538 | A1 | 8/1992 |
| EP | 1 091 809 | A | 4/2001 |
| FR | 2 668 119 | A2 | 4/1992 |
| WO | WO 99/67025 | A1 | 12/1999 |

* cited by examiner 351
345'
32'
1'
11'
325
20
14

3
351
345
32
1
35
20
14

42
27
423
2
4

Fig. 13
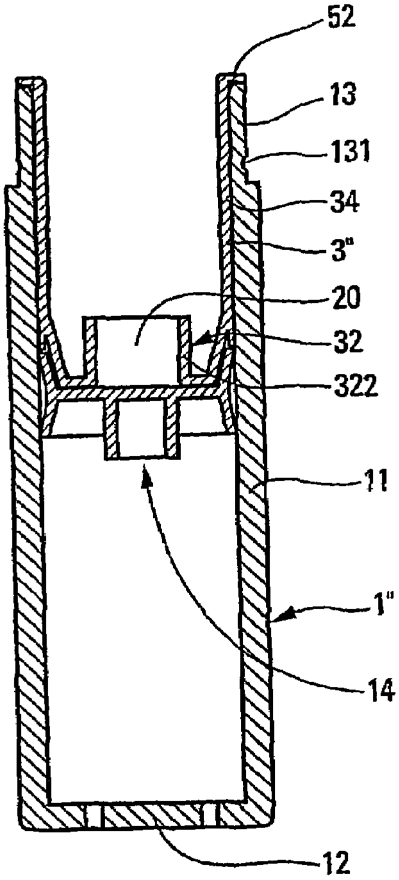
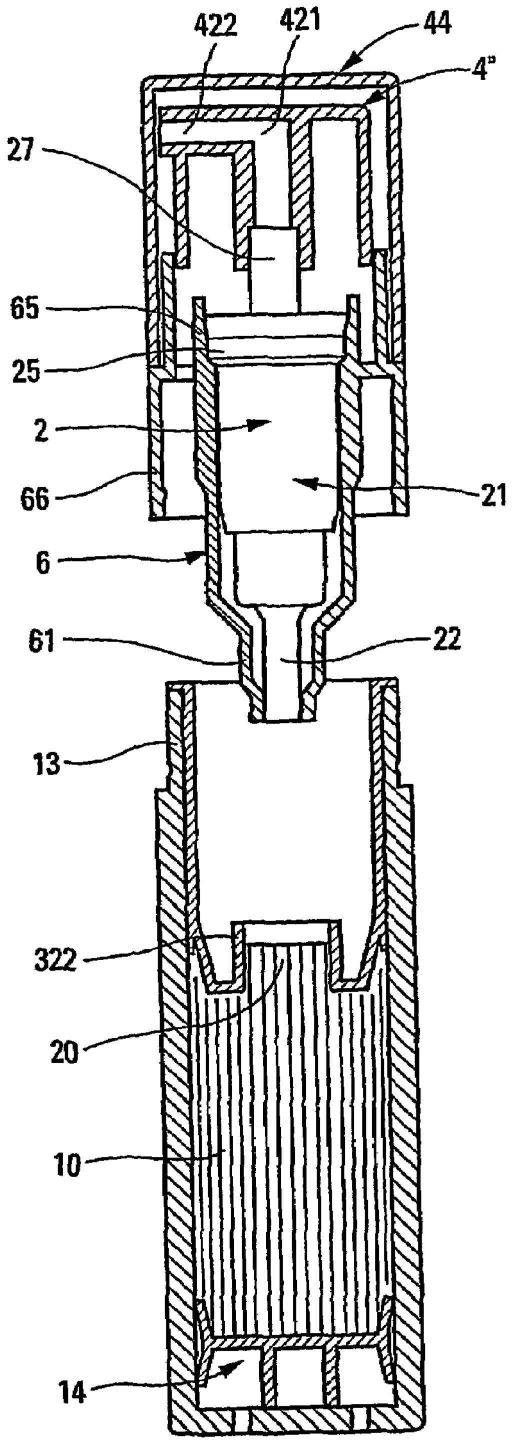
Fig. 14

FLUID DISPENSER AND A METHOD OF ASSEMBLING SUCH A DISPENSER

The present invention relates to a fluid dispenser and to a method of assembling the dispenser. It relates to a manual dispenser that can be held in one hand, and that includes an actuator head (a pushbutton) that can be pressed using a finger of the same hand. Such dispensers are frequently used in the fields of perfumery, cosmetics, or even pharmacy in order to dispense a fluid, such as a perfume, a lotion, a gel, a cream, etc. The fluid can be dispensed in the form of a spray, or even in the form of a stream, a drop, or a bead.

In general, such fluid dispensers comprise a dispenser member, such as a pump, and a reservoir for containing fluid, said reservoir comprising a cylinder and a follower-piston that is slidably mounted in said cylinder. The dispenser further comprises an annular dish presenting an outer periphery that is secured to the cylinder, and an inner periphery defining an opening of section that is small relative to the section of the cylinder. The working volume of the reservoir is defined between the dish and the follower-piston over a height of the cylinder. That is one particular kind of dispenser, in which the reservoir is a reservoir of volume that is variable as a result of the displacement of the follower-piston inside the cylinder as the fluid is taken by the dispenser member. Such dispensers are commonly known as "airless" dispensers, due to the fact that no air is taken into the reservoir in order to compensate for the volume of fluid extracted by the dispenser member. The working volume of the reservoir thus reduces until the follower-piston comes into contact with the dish. The volume is then zero or substantially zero.

The fluid stored inside such a follower-piston reservoir is thus never in contact with the outside air. Any deterioration resulting from oxidization or drying is thus avoided. However, in order to guarantee that the fluid is conserved perfectly inside such a reservoir that is isolated from the outside, it is also necessary for no air, or practically no air to be trapped inside the reservoir while the dispenser is being assembled or filled. An object of the present invention is specifically to provide a way of assembling and filling the reservoir of the dispenser, that guarantees that no air is trapped in the reservoir.

Several assembly or filling techniques or methods have already been used for this purpose. A known technique consists in filling the reservoir and/or in assembling the dispenser member on the reservoir in leaktight manner inside a chamber that is evacuated. That is the safest technique for guaranteeing that the reservoir is filled without any air. However, that technique is costly both economically and technically. The dispenser must pass through various filling stations under a vacuum, which constitutes considerable investment and which also substantially increases the time required to assemble such a dispenser.

There also exist other airless-reservoir filling or assembly techniques that do not use a vacuum chamber. To this end, mention can be made of document EP 0 571 280 which describes a fluid dispenser comprising a pump as dispenser member, and a reservoir comprising a cylinder in which a follower-piston slides in leaktight manner. The pump is assembled in a fastener member that forms a dish having an outer periphery for sliding in the cylinder of the reservoir, and having an inner periphery that forms an opening of section that is small relative to the section of the cylinder. The pump includes a body forming, at its bottom end, a tube internally defining an inlet into the pump. At its opposite, top end, the pump body is provided with a fastener collar for co-operating with a bushing formed by the fastener member. The bottom tube of the pump body is engaged in leaktight manner in the opening of small section formed by the dish. The fastener member and the pump together form a single unit that is pre-assembled before being engaged inside the cylinder of the reservoir. Naturally, before assembling said unit in the cylinder, it is necessary firstly to fill the cylinder, while the follower-piston is situated in its low position. Then, the unit is inserted into the cylinder by sliding the outer bearing surface of the dish inside the cylinder. The dish should slide into the cylinder over a certain height, so as to guarantee a stable axial fastening of the fastener member, and consequently of the pump, inside the cylinder. However, as soon as the dish is engaged in the open top end of the cylinder, air is trapped in the cylinder above the fluid that has already been inserted. In order to enable the trapped air to escape once the dish is sliding in leaktight manner inside the cylinder, grooves are provided that extend over a certain height in the inside wall of the cylinder. Thus, although the outer bearing surface of the dish slides in the cylinder, the trapped air can escape from the reservoir via the grooves in the cylinder. Before arriving in its final assembly position, the dish reaches a section of the bearing surface of the cylinder that does not have any grooves. Complete or total peripheral sealing is thus achieved at the outer bearing surface of the dish. The reservoir thus contains practically only fluid, since the air has been evacuated via the grooves of the reservoir.

In another embodiment in document EP 0 571 280, the outer periphery of the dish engaged around the bottom end of the pump body forms a flexible sealing lip for coming into leaktight sliding contact with the inside of the cylinder. Once the reservoir has been filled, with the follower-piston in its low position, the unit constituted by the pump and the dish is inserted into the cylinder and is pushed therein, causing the flexible sealing lip of the dish to slide against the inside wall formed by the cylinder. The air trapped in the reservoir above the fluid can be evacuated from the reservoir by being forced through a passage between the flexible lip and the cylinder. As a result of its deformability characteristic, the flexible lip can be flexed inwards, so as to release a passage for the air. By continuing to push in the unit constituted by the pump and the dish, the dish eventually comes into contact with the fluid. By continuing to push in the dish, the fluid that is put under pressure in this way is also forced out through a passage between the flexible lip and the cylinder as a result of the flexible lip deforming. Excess fluid can thus rise above the dish inside the cylinder. It is thus guaranteed that the reservoir contains only fluid, or practically only fluid, with all of the air, and even a fraction of excess fluid being evacuated.

In the two embodiments in document EP 0 571 280, the dispenser member, i.e. the pump, is engaged beforehand in the dish so as to form a single entity. More precisely, the inlet tube of the pump body is engaged in leaktight manner in the opening of small section formed by the dish. Thus, the air and any excess fluid are forced out between the outer bearing surface of the dish and the cylinder. In other words, the air and the excess fluid are evacuated around the outer periphery or outer bearing surface of the dish, along the cylinder. While the dish and the pre-assembled pump are being engaged in the cylinder, the volume of air or of fluid that is evacuated is equal to the section of the dish multiplied by the height over which it is displaced. Given that the section of the dish is strictly equal to the inside section of the cylinder, the volume to be evacuated is considerable. It can even be as great as half of the working volume of the cylinder.

In the prior art, document EP 0 486 355 is also known, which describes a fluid dispenser including a fluid reservoir defining a cylinder in which a follower-piston is slidably mounted. The dispenser also includes a dish engaged in the opening of the cylinder and defining an opening of small section. The dispenser also includes a pump assembly constituted by a pump associated with a pushbutton, and by a fastener ring that is secured to the pump by means of a crimping ring.

The bottom end of the fastener ring is engaged in a sheath formed by the dish. The sheath extends concentrically around the opening of the dish. The bottom portion of the body of the pump, which defines an inlet tube, is disposed in the opening of the dish, without creating sealing. The inlet tube of the pump presents a diameter that is substantially smaller than the inside diameter of the opening, so that an annular gap exists between the tube and the opening. The tube of the pump is therefore not sealed in the opening of the dish.

As a result, the fluid can spread into the fastener ring around the body of the pump, by passing through said annular gap formed between the tube and the opening. In other words, the working volume of the reservoir extends beyond the opening, between the fastener ring and the body of the pump.

Document U.S. Pat. No. 5,509,584 describes a dispenser presenting a configuration that is similar to the configuration in document EP 0 486 355. That dispenser also comprises a reservoir, a dish, and a pump. The dish also forms a sheath in which there is engaged a fastener ring that supports the pump.

An object of the present invention is to define another assembly technique that can guarantee that the reservoir is filled without air, or practically without air. Another object of the present invention is to ensure that all, or almost all, of the air is evacuated with a very small head loss. Still another object of the invention is to guarantee that air and/or fluid is evacuated without any need for additional specific means.

In order to achieve these objects, the present invention proposes a method of assembling a fluid dispenser in accordance with claim 1. The opening of the dish is thus used to evacuate, expel, or force out air still present in the reservoir and/or any excess fluid. The method also implies that the dish forming the opening is put into place in the cylinder before the tube of the dispenser member is engaged in the opening of the dish. As a result, the evacuated volume corresponds only to the volume that is displaced by the tube being engaged in the opening. Given that the opening presents a section that is small relative to the section of the cylinder, and consequently of the dish, the evacuated or displaced volume is small relative to the volume that the dish would have displaced, as is the case in the above-mentioned European prior-art document. In other words, the small size of the opening enables the volume of air or fluid that is to be evacuated to be small. This is particularly noticeable when the engagement stroke of the tube in the opening is relative small. The volume to be evacuated is equal to the section of the opening multiplied by the height of the stroke of the tube in the opening.

According to an advantageous characteristic of the invention, the method includes a prior step consisting in filling the reservoir via the opening of the dish. Naturally, this implies that the dish is put into place in the cylinder before the reservoir is filled. This advantageous characteristic may be implemented independently of the fact that the tube of the dispenser member is engaged in the opening. In other words, this method of filling via the opening of the dish may be implemented in a dispenser having a dispenser member with a bottom inlet tube that does not necessarily become engaged in the opening.

According to another advantageous aspect of the invention, the method includes prior steps of disposing the follower-piston in the cylinder so that the working volume of the reservoir is substantially zero; and injecting fluid through the opening so as to displace the follower-piston inside the cylinder, and thus increase the working volume of the reservoir that is filled substantially exclusively with fluid. This filling technique guarantees that the reservoir initially contains no air, or almost no air. It is the injection of fluid that causes the follower-piston to be displaced without drawing in air, and since the reservoir initially contained no air because its volume was zero, no air is contained in the fluid-filled reservoir. Naturally, this filling technique implies that the dish is put into place in the cylinder before filling. However, this technique may be implemented independently of the fact that the tube of the dispenser member is engaged in the opening of the dish.

The method advantageously envisages a prior step of filling the reservoir up to the opening so that there is practically no air left in the reservoir, and then engaging the tube in the opening, forcing the remaining air and the excess fluid out of the reservoir, around the tube, until the tube comes into leaktight contact in the opening. Filling the reservoir to the brim, or almost to the brim, of the top edge of the opening of the dish guarantees that there is no air, or practically no air, in the reservoir. The subsequent engagement of the tube thus has the effect of expelling excess fluid from the reservoir, around the tube.

In a filling variant, the method envisages filling the cylinder from the follower-piston up to a certain height in the cylinder; and inserting the dish into the cylinder until the fluid arrives in the opening of the dish, the engagement of the tube in the opening forcing the excess fluid out of the reservoir, around the tube, until the tube comes into leaktight contact in the opening. In this variant, the opening of the dish is not used as a filler orifice for filling the reservoir. Inserting the dish in the cylinder expels the air from the reservoir via the opening until the fluid rises into the opening. The subsequent engagement of the tube thus has the effect of expelling the excess fluid from the reservoir.

According to an advantageous characteristic, the tube, while it is being engaged in the opening, firstly slides without sealing in the opening so as to enable the excess fluid situated in the opening to be forced out around the tube, and secondly becomes engaged in leaktight manner in the opening, in a final assembly position.

According to another aspect of the invention, the excess fluid that is forced out while the tube is being engaged in the opening is collected in a vented space that communicates with the outside via a passage formed between the dispenser member and reception means in which the dispenser member is received in unsealed engagement. In a variant, the excess fluid that is forced out while the tube is being engaged in the opening is collected in a sealed space that is isolated from the outside by the sealed engagement of the dispenser member in reception means. The collection space, whether it be vented or isolated, makes it possible to store a certain quantity of fluid that squirts from the opening while the tube is being engaged. Even when it is vented, the space is not wide open to the outside, such that the squirted excess fluid remains inside the vented space It should be observed that even when it is vented, the space is completely isolated in leaktight manner relative to the reservoir by means of the tube being engaged in leaktight manner in the opening.

According to another aspect, the dish is made integrally as a single piece with the cylinder. In this event, the reservoir must necessarily be filled via the opening of the dish.

According to another advantageous characteristic, the outer periphery of the dish slides in leaktight manner in the cylinder, moving away from the follower-piston while the tube is being engaged in leaktight manner in the opening. In this event, it is not necessary for the tube to slide initially without sealing in the opening. All the time the tube is sliding in leaktight manner in the opening, the dish can slide in the cylinder, moving away from the follower-piston, so as to guarantee that the working volume in the reservoir remains constant.

According to another advantageous aspect, the tube of the dispenser member is pre-assembled in unsealed manner in the opening of the dish, before the dish is inserted into the cylinder, so as to enable fluid to be forced out between the tube and the opening, the tube coming into its final assembly position in leaktight contact in the opening. In this event, the dispenser member and the dish together form a pre-assembled unit that is engaged as a single piece inside the cylinder. However, the lack of sealing between the tube and the opening makes it possible to evacuate the air that is trapped and even the excess fluid, if any.

The invention also provides a fluid dispenser including evacuation means for enabling fluid and/or air to be forced out of the reservoir between the tube and the opening of the dish. The evacuation means advantageously comprise at least one vent hole between the tube and the opening for putting the inside of the reservoir into communication with the outside, sealing means being provided so as to seal said at least one hole when the tube is in its final assembly position in the opening, so as to isolate the reservoir in leaktight manner. The vent hole(s) make(s) it possible to evacuate air and any excess fluid from the reservoir until the sealing means come to seal the vent hole(s), and thus isolate the reservoir from the outside.

According to another characteristic of the invention, the dispenser member includes a top collar that projects radially outwards, said collar being engaged with reception means so as to hold the dispenser member in stable manner relative to the cylinder. In general, the bottom tube constitutes the bottom-end portion of the dispenser member, while the collar forms one of the top-end portions of the body of the dispenser member. Advantageously, the reception means may be formed by the cylinder. In a variant, the reception means are formed by a fastener member that also forms the dish. The collar is advantageously received in unsealed manner in the reception means, a vented space thus being created between the leaktight engagement of the tube in the opening and the unsealed engagement of the collar with the reception means, the space serving to collect the excess fluid forced out by the engagement of the tube in the opening. In a variant, it is also possible to envisage that the engagement of the collar in the reception means provides sealed engagement so that the space is isolated.

In a particular embodiment, the body of the dispenser member is received in a fastener sheath forming the tube and the collar. In this event, the tube and the collar are no longer formed directly by the body of the dispenser member.

According to another aspect, the dish and the cylinder are formed as a single piece.

The invention is described more fully below with reference to the accompanying drawings which show several embodiments of the invention by way of non-limiting example.

In the figures:

FIG. 13 is a vertical section view through a reservoir fitted with a fastener member constituting a second embodiment of the invention;

FIG. 14 is an exploded view of the dispenser in accordance with the second embodiment of the invention, while it is being assembled.

Figure 1:
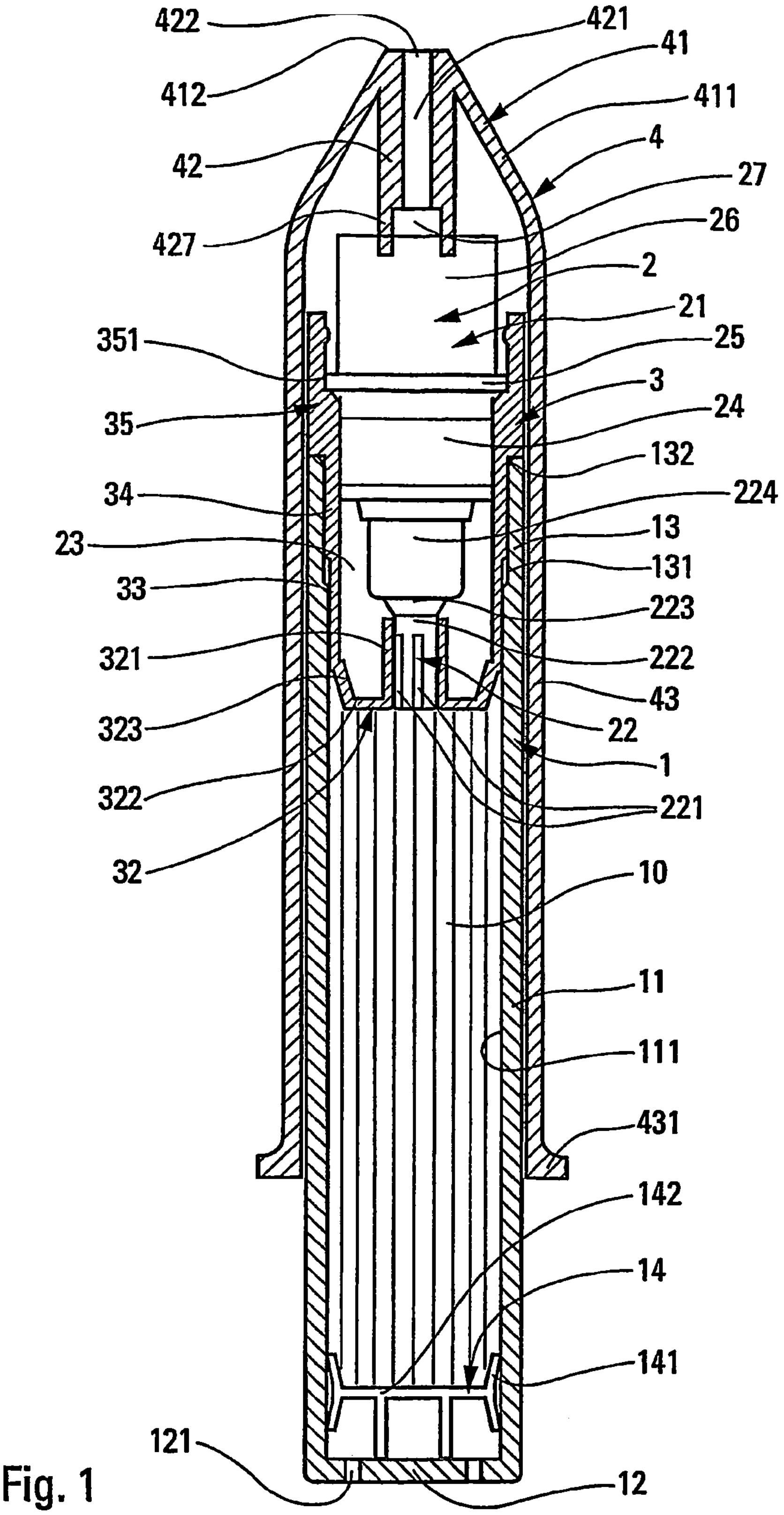
FIG. 1 is a vertical section view through a fluid dispenser constituting a first embodiment of the invention.

FIGS. 1 to 12 show a first embodiment of a fluid dispenser of the invention. However, some variants are possible without them being considered as being another embodiment. Specifically, the FIG. 4 variant should be considered separately. However, in all of FIGS. 1 to 12 (with the exception of FIG. 4), the dispenser comprises five component parts, namely: a receptacle 1; a follower-piston 14; a fastener member 3; a dispenser member 2; and a dispenser head 4. Reference is made initially and more particularly to FIGS. 1, 2, 3, and 9 in order to describe the five above-mentioned component parts of the fluid dispenser constituting the first embodiment.

The receptacle 1 comprises a substantially elongate cylinder 11 which internally defines a cylindrical sliding-contact wall 111. The outside of the cylinder 11 can be of any surface type or shape. The inner sliding-contact wall 111 extends over the main portion of the cylinder 11. At its top end 132, the cylinder forms a neck 13 defining an opening into the cylinder 11. The inside of the neck 13 is provided with a reception profile 131. At its opposite end, the cylinder 11 is closed by a bottom wall 12 that is pierced with through holes 121. The bottom wall 12 is optional, such that the receptacle 1 can amount to a simple cylinder 11 that is open at both its ends. The receptacle 1 can be made out of any rigid material, and more particularly can be made out of plastics material, glass, or metal. The cylinder 11 is substantially non-deformable.

The follower-piston 14 comprises an end wall 142 that is bordered at its periphery by a lip 141 for coming into leaktight sliding contact with the inner sliding-contact wall 111 of the cylinder 11. In FIG. 1, the follower-piston 14 is in its lowest position in contact with the bottom wall 12.

The fastener member 3 comprises a bottom dish 32, a ring 34, and a top reception bushing 35.

Figures 2, 3, 4:
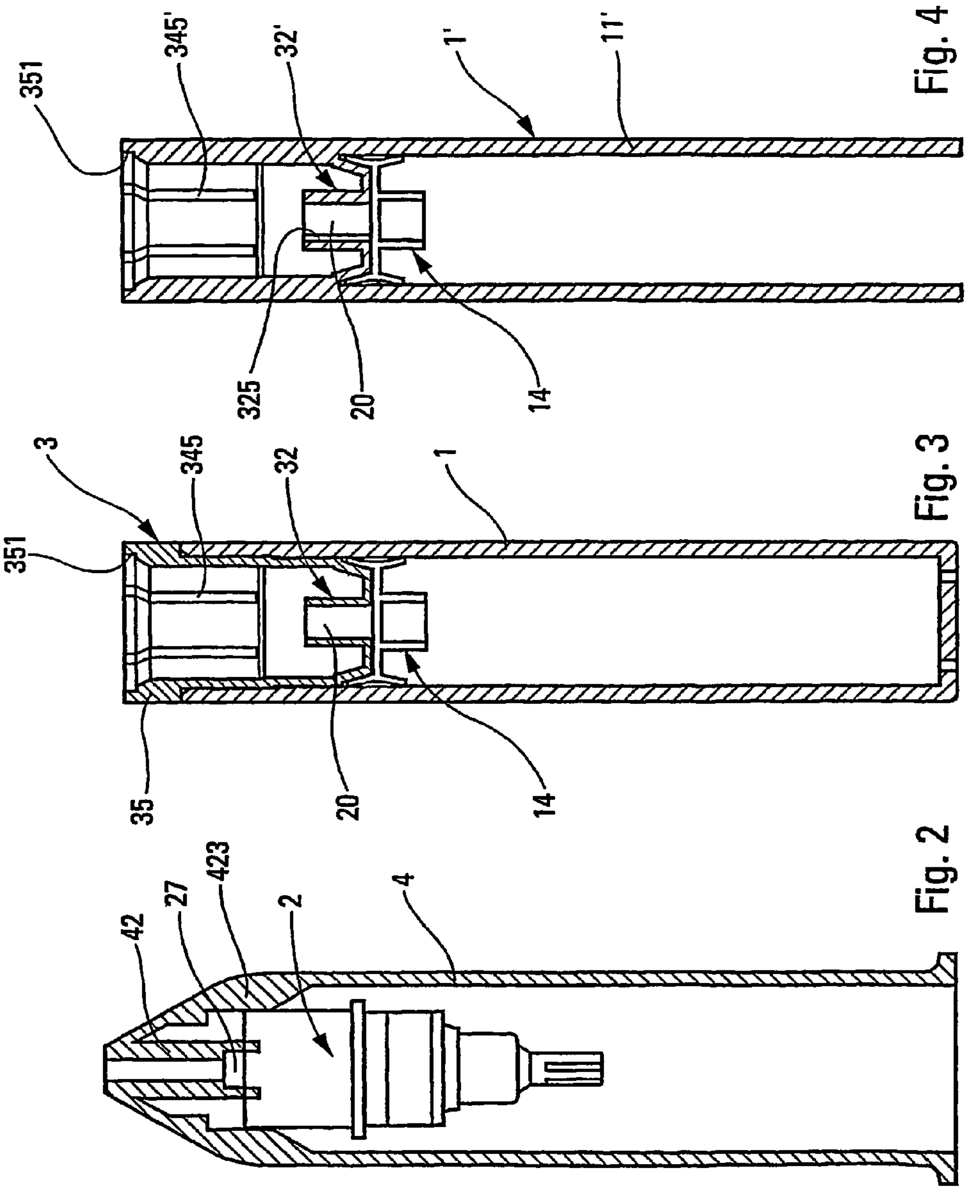
FIG. 2 is a vertical section view through the dispenser head and the dispenser member of the FIG. 1 dispenser.
FIG. 3 is a vertical section view through the reservoir and the fastener member of the FIG. 1 dispenser.
FIG. 4 is a variant embodiment of FIG. 3.
Figure 5:
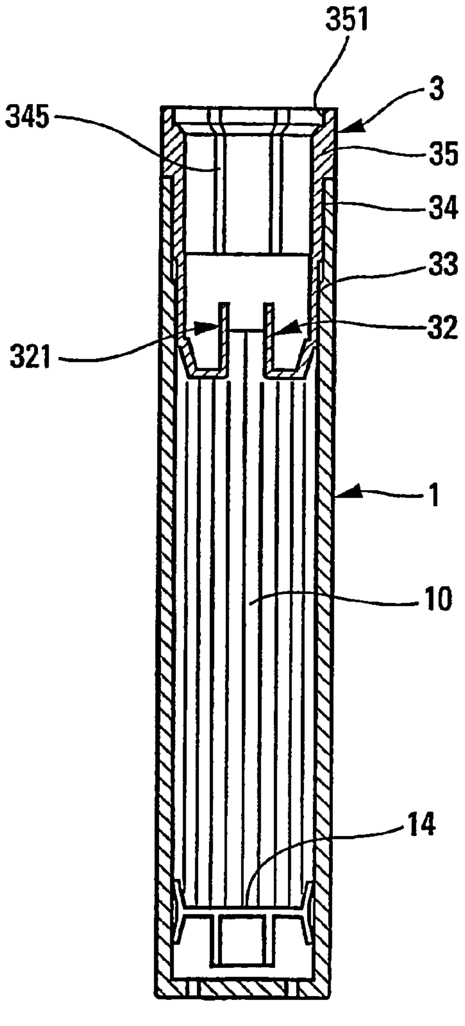
FIG. 5 is a view similar to the view in FIG. 3 with the reservoir being in the filled state.
Figure 6:
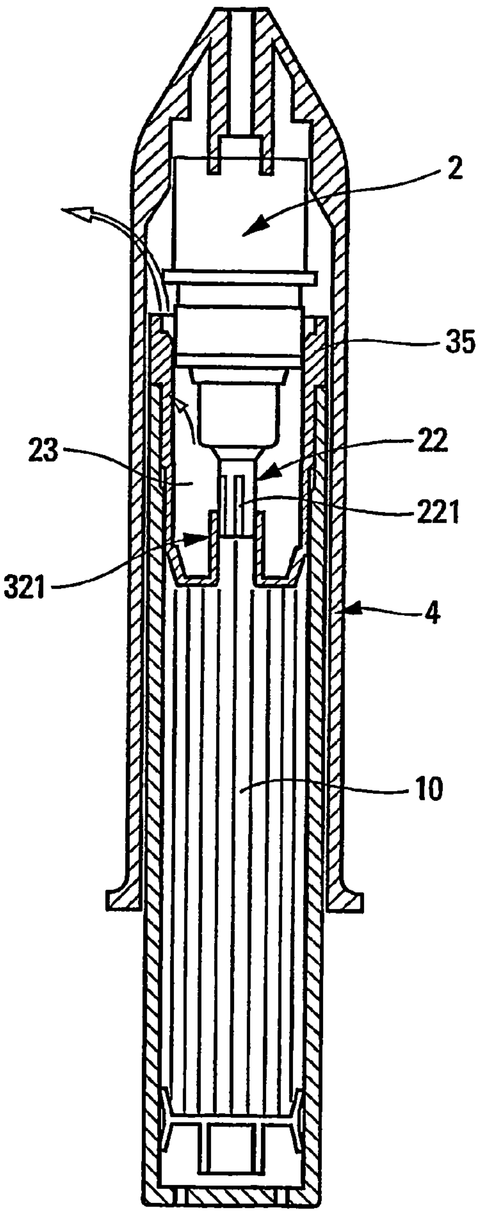
FIG. 6 is a view of the FIG. 1 dispenser while it is being assembled.
Figure 9:
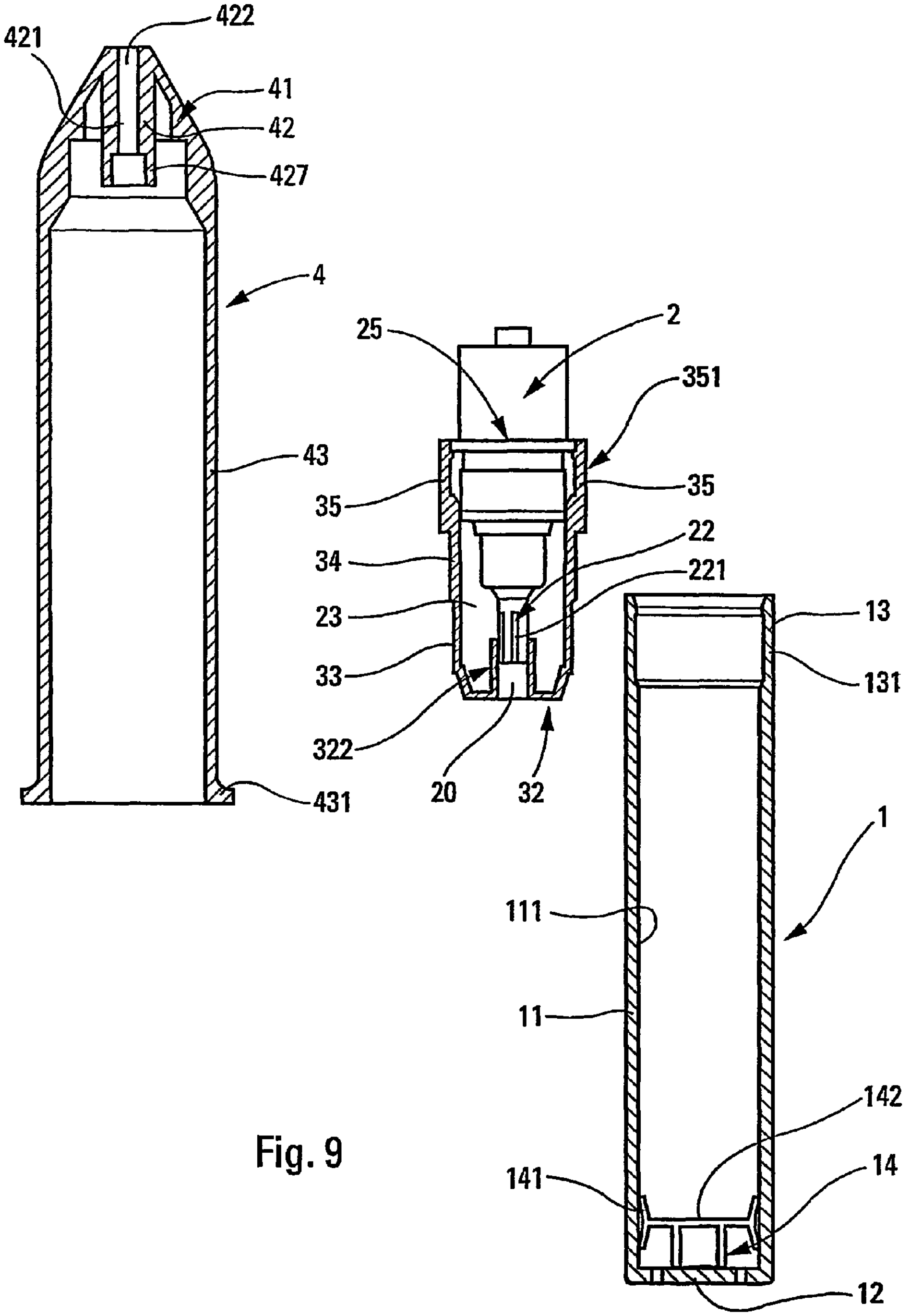
FIG. 9 is an exploded view of the FIG. 1 dispenser, in order to show an alternative assembly method.

The dish 32 includes an outer periphery formed by a cylindrical section 33 of outside diameter that is less than, equal to, or very slightly greater than the inside diameter of the cylinder 11 at its inner sliding-contact wall 111. The cylindrical section 33 is extended downwards by a frustoconical section 323 that tapers progressively away from the inner wall 111. The frustoconical section 323 is then extended by an annular flange 322. The flange 322 presents an inner periphery on which a sleeve 321 is formed. As can be seen in FIGS. 3 and 9, the sleeve 321 defines an opening 20. It is also possible to envisage the dish 32 without such a sleeve 321, such that the opening 20 is thus defined by the inner periphery of the annular flange 322. In summary, the outer periphery of the dish 32 formed by the cylindrical section 33 is secured to, or engaged with, the cylinder 11, while the inner periphery of the dish 32 forms an opening 20.

The ring 34 extends the dish 32 upwards. The ring 34 advantageously presents an external profile that is suitable for co-operating with the reception profile 131 formed by the neck 13. The profile of the ring 34 is preferably suitable for fastening, by snap-fastening in the reception profile 131. A simple fastening, by clamping, is also possible. The essential function of the ring 34 is to fasten the fastener member 3 in the neck 13 of the cylinder 11. However, the cylindrical section 33 of the dish 32 can also contribute to said fastening. The cylindrical section 33 and/or the ring 34 also provide leaktight contact inside the neck 13 or more generally the cylinder 11. The ring can be considered as forming an integral part of the dish, when the section 33 is not engaged with the cylinder.

The reception bushing 35 extends the ring 34 upwards. The bushing 35 is situated outside the cylinder 11. Its outside diameter can be substantially equal to the outside diameter of the cylinder 11, so that the bushing 35 extends upwards in register with the cylinder 11. The inside of the bushing 35 forms reception means 351 in the form of a snap-fastener housing.

The fastener member 3 thus formed by the dish 32, the ring 34, and the bushing 35 is inserted into the cylinder 11 via the opening formed by the neck 13, until the dish 32 is situated level with the sliding-contact wall 111, with the ring 34 engaged in the profile 131, and the bushing 35 bearing against the top end-edge 132 of the neck 13.

The fastener member 3 when engaged in the cylinder 11 co-operates with the inner sliding-contact wall 111 and the follower-piston 14 to define an internal volume serving as a fluid reservoir 10. The reservoir communicates with the outside via the opening 20 formed in the dish 32. The working volume of the reservoir 10 varies as a function of the position of the follower-piston 14 in the cylinder 11. The volume of the reservoir can even be zero when the follower-piston 14 is in abutment contact under the collar 32, as can be seen in FIG. 3. The working volume is made smaller by the bottom face of the dish 32 presenting a negative shape that is complementary to the shape of the follower-piston 14. More precisely, the lip 141 of the follower-piston 14 can become inserted around the frustoconical section 323, as can be seen in FIG. 3.

The dispenser member 2, in this example a pump, comprises a body 21, and an actuator rod 27 that moves down and up in the body 21. The body 21 presents a plurality of sections of different diameters. From the top of the body 21 downwards, the body comprises a top first section 26 inside which the actuator rod 27 extends. Below the top section 26, the body forms a collar 25 that projects radially outwards. Below the collar, the body forms an upper middle section 24 that is extended downwards by a lower middle section 224. Below the lower middle section, the body forms a frustoconical section 223 that is extended downwards so as to form a tube 222 which internally defines an inlet duct into the body 21. This is a particular non-limiting design for a pump body. Naturally, it is possible to use a pump having a body of different shape. In particular, the sections 26, 24, and 224 can be arranged in various ways. For example, the section 26 can be situated below the collar 25, so that said collar is thus situated at the top end of the pump body 21. However, the inlet tube 22 is always situated right at the bottom of the pump body 21. The inlet tube 22 also constitutes the section with the smallest outside diameter. As a result, all the other sections present greater diameters, with the collar 25 advantageously presenting the greatest diameter at is outer periphery.

The pump 2 is engaged in the fastener member 3 so that in its final assembly position, as shown in FIG. 1, the collar 25 is engaged in the reception housing 351 of the bushing 35, and the inlet tube 22 is engaged in the opening 20 of the dish, or more precisely, in the sleeve 321. The engagement of the collar 25 in the housing 351 can optionally be sealed over the entire periphery of the collar. The engagement of the tube 22 in the sleeve 321 is leaktight. The engagement of the pump 2 in the fastener member 3 defines an internal space 23 that extends around the pump body inside the fastener member 3. The internal space 23 does not communicate with the reservoir 10, given that the tube 22 is engaged in leaktight manner in the sleeve 321. However, the internal space 23 can communicate with the outside when the collar 25 is not in sealed engagement with the housing 351. In contrast, when the collar 25 is in sealed engagement with the housing 351, the internal space 23 is sealed and isolated from the outside. When the collar 25 is in sealed contact with the housing 351, it is even possible for the upper middle section 24 to come into sealed contact with the bushing 35, and optionally with the ring 34. Thus, as a function of the sealing or of the lack of sealing in the top portion of the body 21, the internal space 23 is either vented or sealed. In order to guarantee that the collar 25 and the upper middle section 24 do not come into sealed engagement with the fastener member 3, vent grooves 345 can advantageously be provided in the inside wall of the bushing 35 and of the ring 34, as can be seen in FIG. 3. In this event, the internal space 23 is certainly vented.

The inlet tube 22 fulfills a plugging function for plugging the reservoir 10 as a result of being engaged in leaktight manner in the sleeve 321.

Figure 7:
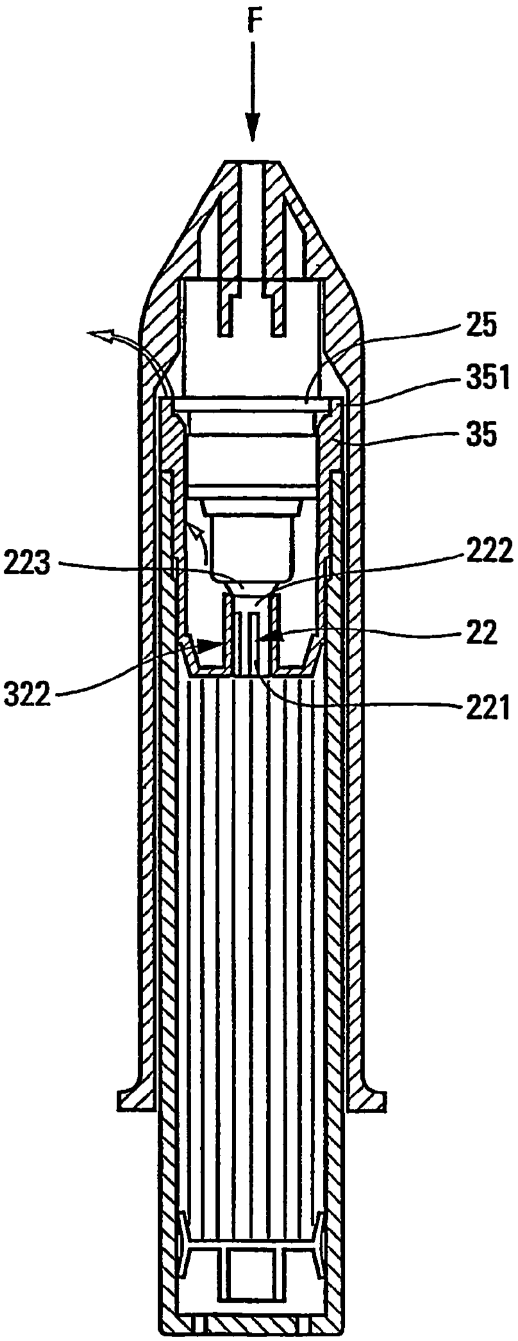
FIG. 7 is a view similar to the view in FIG. 6 at the end of assembly.
Figure 8:
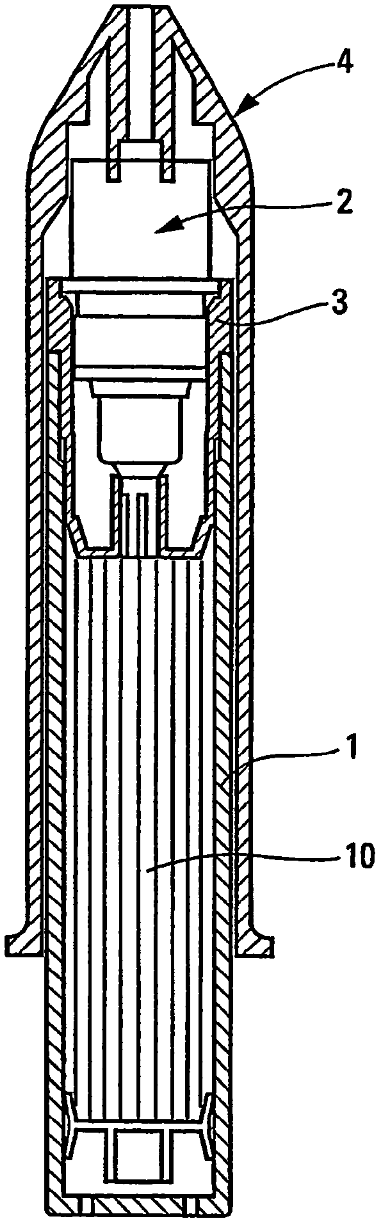
FIG. 8 is a view of the dispenser after it has been assembled.

In the invention, the tube 22 can be provided with one or more vent holes 221 which can be in the form of grooves or recesses formed vertically or longitudinally in the outside wall of the tube. The holes 221 extend over a fraction of the height of the tube 22, thereby allowing a hole-free top portion 222 to remain. The portion 222 can present a perfectly cylindrical outside wall In addition, it is the portion 222 that seals the tube 22 in the sleeve 321. In a variant, the vent hole(s) 221 can extend over the entire height of the tube 22, and sealing can be provided by the frustoconical section 223 situated above the tube 22, when it becomes engaged with the top end of the tube 321, as can be seen in FIGS. 7 and 8. However, it is preferable for the vent holes to end before they reach the frustoconical section 223, thereby allowing a smooth cylindrical portion 222 to remain. The essential point is to provide final sealing between the pump 2 and the fastener member 3 at the opening 20. In a variant, it is also possible to envisage that vent holes are formed in the inside wall of the sleeve 321. The vent holes would thus extend from the free top end of the sleeve 321, and would extend vertically downwards, but without reaching the bottom end of the sleeve 321. This is shown in the variant embodiment in FIG. 4, with the vent holes designated by the numerical reference 325. The function of the vent holes, whether they be situated in the tube 22 or in the sleeve 321, is explained below.

The dispenser head 4 comprises a cap 41 and a sheath 43. The cap 41 comprises a bullet-shaped or frustoconical outside wall 411 that presents a generally pointed aspect with a top wall 412. The top wall 412 is pierced by a dispenser orifice 422. The inside of the cap 41 includes an outlet duct 42 that interconnects the top end of the actuator rod 27 and the dispenser orifice 422. The outlet duct 42 presents a bottom end forming a reception sleeve 427 for the top end of the actuator rod 27. The duct 42 thus defines an outlet channel

421 that interconnects the actuator rod 27 and the dispenser orifice 422 situated at the top of the cap 41. It should be observed that the duct 42 extends axially in line with the actuator rod 27. The axis of downward-and-upward displacement of the actuator rod 27 in the pump body 21 coincides with the longitudinal axis of symmetry of the dispenser, which axis of symmetry passes through the dispenser orifice 422, the duct 42, the actuator rod 27, the tube 22, the follower-piston 14, and the bottom wall 12. Thus, the outlet duct 42 forms a kind of extension of the actuator rod 27, having a free end that defines the dispenser orifice 422 from which the user can recover the fluid dispensed by the pump 2. In this embodiment, the position of the dispenser orifice 422 is not only axial, it is also at the top. However, it is possible to provide a top orifice that is off-centered (non-axial).

In the invention, the sheath 43 extends downwards in the extension of the frustoconical or bullet-shaped outside wall 411 of the cap 41. The sheath 43 is made integrally as a single piece with the cap 41. The sheath 43 is in the form of a casing that can present an outside shape that is circularly-cylindrical or of any other shape that advantageously imparts an attractive appearance to the dispenser. In the embodiment shown in FIGS. 1 to 12, the sheath 43 is in the form of a simple circular cylinder that is connected at its top end to the cap 41, and that advantageously forms a small outwardly-directed rim 431 at its bottom end. The sheath 43 surrounds the pump 2, the fastener member 3, and a fraction of the cylinder 11. In FIG. 1, the sheath 43 extends around the top two-thirds of the cylinder 11. Consequently, there remains a bottom third of the cylinder 11 that projects from the sheath 43; given that the bottom third forms the bottom wall 12, said bottom wall is thus situated outside the sheath 43.

As a result of the cylinder 11 presenting a small outside diameter compared to its height, and as a result of the sheath 43 that surrounds it presenting similar proportions, the fluid dispenser constituting this embodiment presents a very slender, elongate appearance that is comparable to that of a pen. The resemblance to a pen is all the more striking when the dispenser orifice 422 is situated axially at the top, as with the tip of a pen.

With reference to FIG. 1, an actuation cycle of the dispenser in this embodiment is described below. The reservoir 10 is filled with fluid, with little or no air being trapped in the reservoir. The follower-piston 14 is in abutment against the bottom wall 12. The dispenser can be held by the user with one hand grasping the sheath 43, and with the projecting rim 431 advantageously coming into abutment against the index finger. The user can thus use the thumb to press on the bottom wall 12. By exerting enough pressure, the receptacle 1 is pushed into the sheath 43. Given that the fastener member 3 and the pump body 21 are constrained to move with the receptacle 1, said fastener member and pump body are also displaced inside the sheath 43. However, the actuator rod 27 secured to the cap 41 remains stationary; this results in the pump body 21 being displaced relative to the actuator rod 27. The pump 2 is thus actuated and a dose of fluid is dispensed through the outlet duct 42 as far as the dispenser orifice 421. Dispensing is very accurate given that the handle of the dispenser, namely the sheath 43, is not able to move relative to the dispenser orifice 422, which thus remains stationary during dispensing.

In all of FIGS. 1 to 12, with the exception of FIG. 4, the fastener member 3 constitutes an element that is initially separate from the receptacle 1, and that is subsequently fitted in the opening of the receptacle. In FIG. 4, the fastener member is made integrally as a single piece with the receptacle 1'. The cylinder 11' can be substantially identical to the cylinder in the first embodiment. However, in this embodiment, the receptacle 1' does not have a bottom wall, so as to make it possible to insert the follower-piston 14 in the cylinder 11'. The dish 32' can be identical to the dish in the first embodiment. However, in this embodiment, the dish 32' is made with a sleeve that is provided with vent holes 325. This characteristic can also be integrated in the first embodiment, as mentioned above. In contrast, the rest of the fastener member incorporated in the receptacle 1' can present a shape that is completely identical. The receptacle 1' is thus in the form of a tube that is open at both ends, and with a dish 32' disposed therein. Naturally, the dish 32' forms an opening 20 that puts the two portions of the tube into communication with each other. In addition, in comparison with FIG. 4, it can be seen that the only noticeable difference between the two variant embodiments is that the bottom wall is absent in FIG. 4.

The various techniques and methods of assembling and filling such a fluid dispenser are described below.

With regard to filling the reservoir, an aim is for the reservoir to be filled with fluid only, i.e. ideally it should not contain any air whatsoever. In practice, it is practically impossible for there to be no air whatsoever inside the reservoir. Consequently, an aim is to minimize the presence of air inside the reservoir as much as possible. Firstly, the reservoir can be filled via the opening 20 of the dish, using the sleeve 321 to engage a filler nozzle. In a variant, the reservoir can be filled before the fastener member 3 is assembled in the receptacle 1.

In the first technique consisting in filling the reservoir via the opening 20, it is advantageous firstly to dispose the follower-piston 14 in contact with the dish 32, as can be seen in FIGS. 3 and 4. The working volume of the reservoir 10 is thus zero, since the shape of the follower-piston 14 matches the underside of the dish 32 perfectly. By fitting the filler nozzle into the sleeve 321, fluid can be injected against the follower-piston 14 that is thus displaced inside the cylinder 11 under the pressure of the injected fluid. The working volume of the reservoir thus increases until fluid is no longer injected. It is possible to continue injecting until the follower-piston 14 comes into abutment against the bottom wall 12, as in FIG. 1, for example. It is also possible to stop injecting beforehand, as in FIG. 5. By starting from the position in which the follower-piston 14 is in abutment against the dish 32, this ensures that initially there is no air inside the reservoir, since its working volume is zero. The injected fluid allows almost no air bubbles to exist inside the reservoir. A reservoir is thus obtained that is filled solely with fluid. The fluid reservoir is advantageously filled up to the sleeve 321, and preferably substantially up to the top edge of the sleeve 321. The reservoir 10 is thus filled to the brim.

In the second technique, in which the fastener member 3 is not in place in the receptacle 1 while the reservoir is being filled, the follower-piston 14 is preferably disposed initially in its low position, e.g. in contact with the bottom wall 12. The filler nozzle thus fills the reservoir 10 from the follower-piston 14 up to a certain height in the cylinder 11. Then, the fastener member 3 is engaged in the receptacle 1. The cylinder 11 is advantageously filled with a quantity of fluid such that when the fastener member 3 is engaged completely in the receptacle 1, fluid is forced into the opening 20 through the sleeve 321. Excess fluid can even be forced out of the sleeve 321 in such a manner as to be collected in the dish 32 around the sleeve 321. In this way, it is also guaranteed that with the exception of any air bubbles, the reservoir is completely filled solely with fluid.

Naturally, the two filling techniques described above can be protected independently. The fact of filling the reservoir to the brim of the opening 20 is a characteristic that can also be protected independently of the filling technique.

With regard to assembling the pump 2 in the fastener member, it is also advantageous for this operation to favor the elimination, the expulsion, or the exclusion of any air bubbles in the reservoir. As mentioned above, the pump 2 is assembled in the fastener member 3 by engaging its tube 22 in leaktight manner in the opening 20, and by engaging the collar 25 in optionally-sealed manner in the reception housing 351. In the invention, by means of the presence of the vent holes 221 or 325, the air that might still be present in the reservoir 10 before the tube is engaged in the sleeve 321 can be evacuated from the reservoir via the vent holes while the tube is being engaged in the sleeve 321. This expulsion is possible while the vent holes put the inside of the reservoir into communication with the outside. However, in the final position, the vent holes are obstructed in such a manner as to provide sealed engagement at the opening 20. The vent holes make it possible to evacuate any air that might be trapped in the opening 20, and they also make it possible to force out any excess fluid that is situated in the opening 20. By advantageously filling the reservoir to the brim of the sleeve 321, the absence of air is already practically guaranteed. By also making it possible to evacuate air or fluid while the tube is being engaged in the sleeve, before it reaches the final leaktight assembly position, it is practically impossible for any air to remain in the reservoir.

Figures 10, 11, 12:
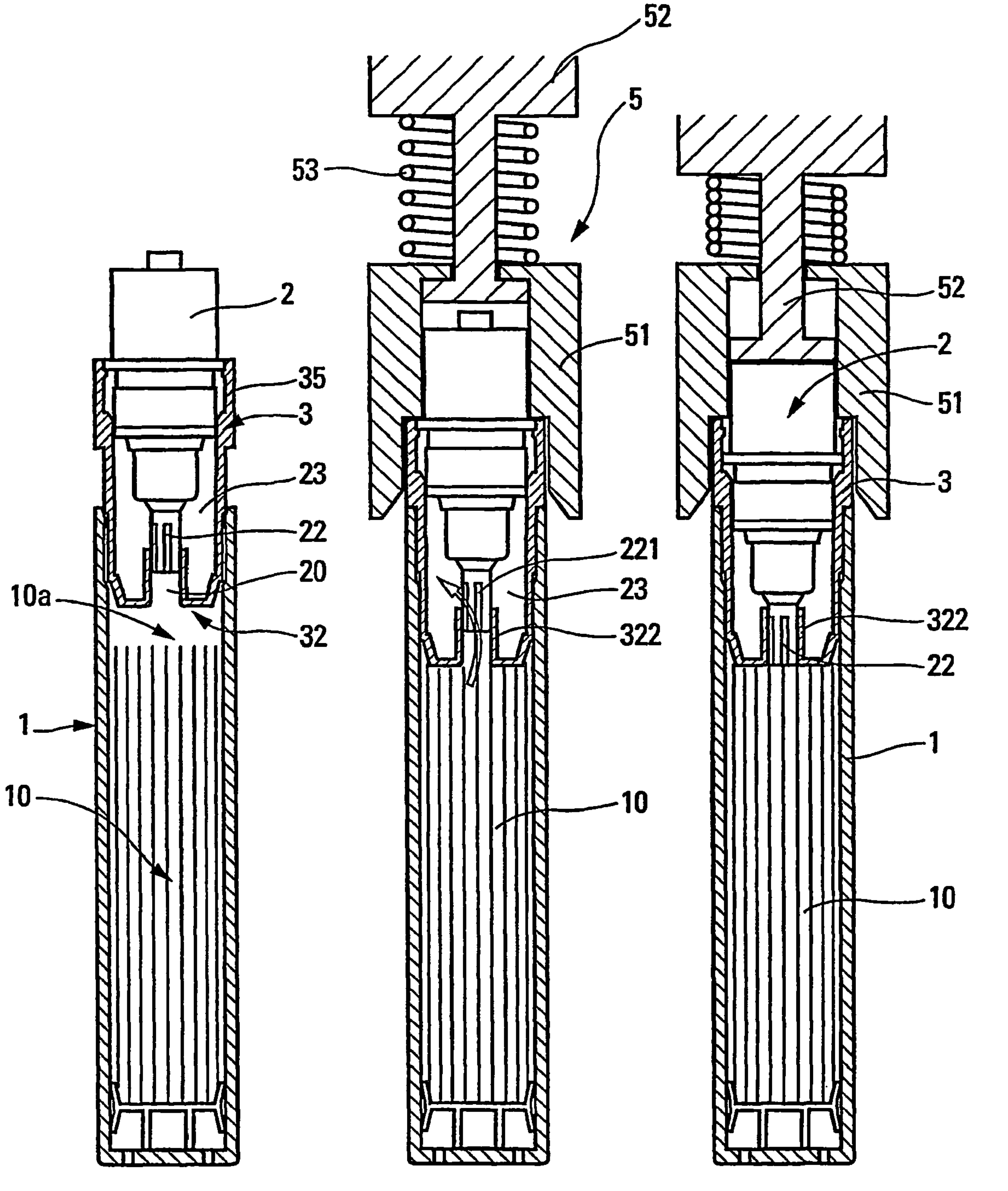
FIG. 10 is a view of the FIG. 9 dispenser during an assembly step.
FIG. 11 is another view of the FIG. 9 dispenser during a subsequent assembly step.
FIG. 12 is a view of the FIG. 9 dispenser at the end of assembly.

Naturally, the final leaktight assembly position of the tube 22 in the sleeve 321 is possible only when the fastener member 3 is itself in its final assembly position in the receptacle 1. However, the pump 2 can be pre-engaged or pre-assembled in the fastener member 3 while the fastener member 3 is being engaged in the receptacle 1. The fastener member 3 and the pump 2 thus constitute a pre-assembled unit before final assembly. The pump 2 can be pre-assembled in the fastener member 3 so that the tube 22 is engaged in unsealed manner in the sleeve 321. This is perfectly possible as a result of the presence of the vent holes. The collar 25 can be prepositioned above its reception housing 351. Once the reservoir has been filled, the unit can then be assembled on the reservoir, as can be seen in FIG. 10. Pressure can firstly be exerted on the fastener member 3 by means of a press 5 provided with a socket 51. This can be seen in FIG. 11. As soon as the fastener member reaches its final assembly position in the receptacle 1, the press 5 then presses on the pump 2, so as to assemble it permanently in the fastener member 3, as shown in FIG. 12. It can be seen that before said last step of assembling the pump in the fastener member, any air that might be trapped and any excess fluid can be evacuated from the reservoir 10 via the vent holes 221 that are still putting the inside of the reservoir 10 into communication with the internal space 23. The expulsion of air and/or excess fluid is represented by the arrow in FIG. 11.

The air and the fluid evacuated from the reservoir is advantageously collected in the internal space 23 that can be sealed or vented as a function of the optionally-sealed engagement of the collar 25 in the reception housing 351. When the space 23 is vented, any air that might have been evacuated from the reservoir can also escape to the outside around the collar 25. However, as a result of gravity and of surface-tension phenomena, the fluid remains held to the wall of the dish 32.

The vent holes 221 or 325 thus constitute evacuation means for evacuating air and/or fluid from the reservoir. It is advantageous for the evacuation to be performed by means of the tube 22, since it presents a small section that thus enables a small quantity of air or fluid to be evacuated. This is not the case if the dish 32 is used to evacuate air and fluid while it is being engaged in the receptacle 1, as is the case in document EP 0 571 280.

Reference is made below to FIGS. 13 to 17 in order to explain a second embodiment of the invention. The dispenser comprises a receptacle 1" also forming a cylinder 11 inside which there slides a follower-piston 14 which can be identical to the follower-piston of the preceding embodiment. The receptacle 1" also forms a neck 13 which, on its outside, forms a snap-fastener profile 131. In addition, the receptacle 1" also forms a bottom wall 12 that is pierced with through holes. The dispenser includes a fastener member 3" that is engaged in the cylinder 11 via the neck 13. The fastener member 3" includes a dish 32 forming a sleeve 322 which internally defines an opening 20. The dish 32 is extended upwards by a slide ring 34 that is engaged in sliding manner inside the cylinder 11. At its top end, the ring 34 forms an outwardly-directed rim 52 that comes to bear against the top end of the neck 13. The reservoir 10 can be filled via the opening 20 by pushing the follower-piston 14 towards the bottom wall, as described above.

The dispenser includes a pump 2 which can be identical or similar to the preceding embodiment. The pump includes a body 21 defining a bottom inlet tube 22 and a top collar 25. The pump also includes an actuator rod 27 that is axially displaceable, downwards and upwards, inside the body 21. In this embodiment, the pump 2 is provided with a dispenser head 4" that includes an outlet channel 421 that opens out to a dispenser orifice 422. The head can be covered by a cap 44.

Figure 17:
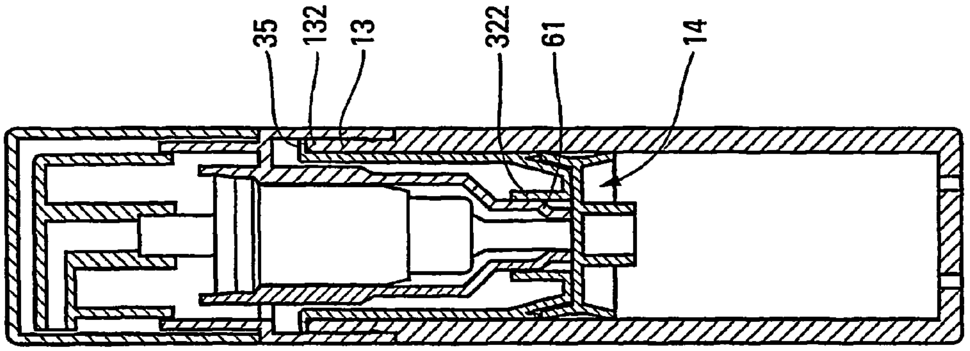
FIGS. 15 to 17 show various steps of assembling the FIG. 14 dispenser.
Figure 16:
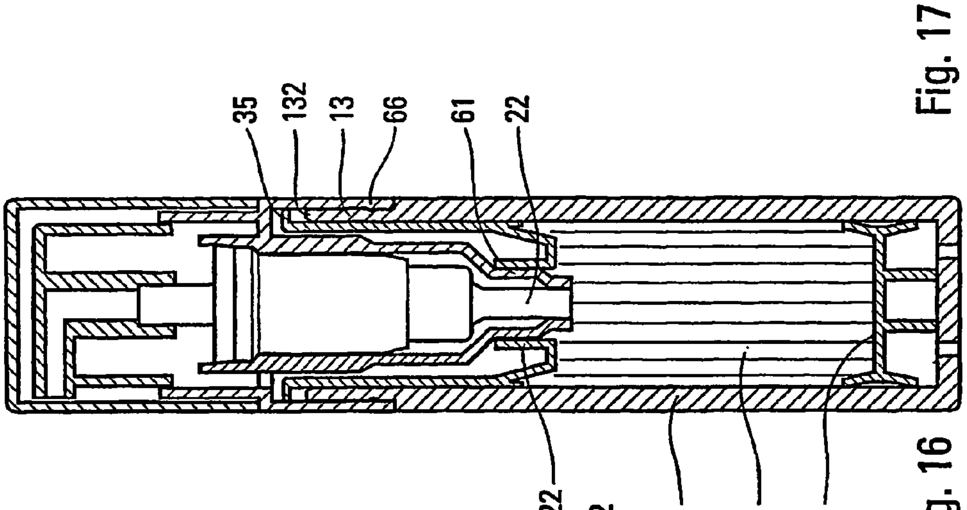
Figure 15:
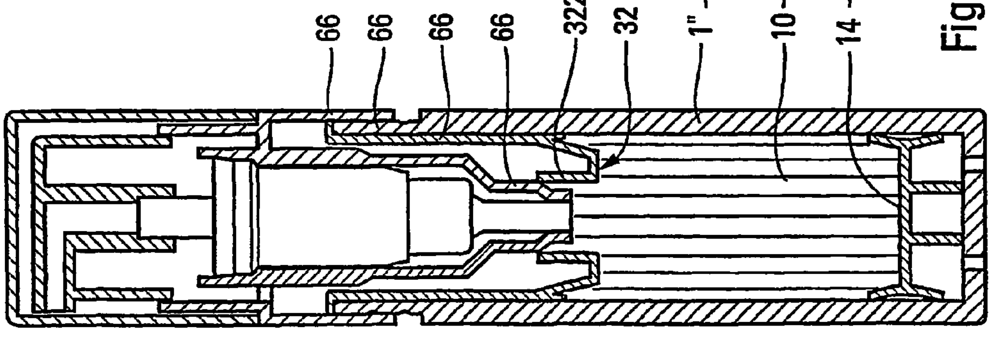

In this embodiment of the invention, the pump 2 is assembled in a fastener sheath 6 that surrounds the pump body 21. The sheath includes a top snap-fastener housing 65 that receives the collar 25, and a bottom sleeve 61 in which the tube 20 is received in leaktight manner. Furthermore, the fastener sheath 6 forms a fastener collar 66 for becoming engaged with the fastener profile 131 formed on the outside of the neck 13. The cap 44 is assembled in engagement with the collar 66 of the sheath 6. FIG. 14 shows the dispenser before the unit constituted by the sheath 6 and the pump 2 is assembled on the unit constituted by the receptacle 1" and the fastener member 3". The reservoir 10 is filled up to the opening 20. By lowering the top unit onto the bottom unit, the sleeve 61 penetrates into the opening 20 until it comes into leaktight sliding contact inside the sleeve 322. At the same time, the collar 66 starts to become engaged with the neck 13. This is shown in FIG. 15. By continuing to engage the sleeve 61 in the sleeve 322, the pressure inside the reservoir 10 rises, thereby causing the fastener member 3" to rise in the cylinder 11 like a piston. This effect can be observed by the rising of the rim 35 in FIG. 16. The fastener member 3" is able to slide as a result of the slide ring 34 not being securely engaged inside the cylinder 11. FIG. 17 shows the dispenser with the reservoir empty. In particular, it should be observed that the rim 35 has come back into contact with the top end 132 of the neck 13 as a result of the suction effect at the end of emptying the reservoir.

In this second embodiment, the reservoir is also closed by engaging the tube 22, or more precisely the sleeve 61 that surrounds the tube, in an opening of section that is small relative to the section of the cylinder 11 in which the follower-piston 14 slides. A variant embodiment can very well be envisaged in which the sheath 6 stops short of the tube 22, so that it is the tube 22 itself that becomes engaged in the opening 20. In addition, the sheath is entirely optional: the advantageous characteristic resides in the fact that the fastener member 3" can be displaced by means of a piston effect inside the cylinder 11 when the pump 2 becomes engaged in the opening 20.

It should be observed that the various above-mentioned technical aspects or characteristics can often be implemented independently so that they can be protected independently. This applies particularly to reservoir-filling techniques that can be implemented independently of the techniques for assembling the pump in the dish.

The invention claimed is:

1. A method of assembling a fluid dispenser comprising:

a dispenser member (2) comprising a body including an inlet tube (22; 61) which internally defines an inlet for admitting fluid into the dispenser member;

a reservoir (10) for containing fluid, said reservoir comprising a cylinder (11; 11') and a follower-piston (14) that is slidably mounted in said cylinder; and an annular dish (32; 32') presenting an outer periphery (33) that is secured to the cylinder (11; 11'), and an inner periphery (321) defining an opening (20) of section that is small relative to the cylinder, the working volume of the reservoir (10) being defined between the dish (32; 32') and the follower-piston (14) over a height of the cylinder, the method including the successive steps of:

filling the reservoir (10) with fluid; and engaging the tube (22) in leaktight manner in the opening;

wherein the step of filling the reservoir comprises filling the reservoir up to the opening so that there is practically no air left in the reservoir, and then performing the step of engaging the tube in the opening, forcing the remaining air and the excess fluid out of the reservoir, around the tube, until the tube comes into leaktight contact in the opening.

2. A fluid dispenser assembly method according to claim 1, wherein the step of filling the reservoir (10) comprises filling the reservoir via the opening (20) of the dish (32; 32').

3. An assembly method according to claim 1, wherein the step of filling the reservoir comprises:

disposing the follower-piston in the cylinder so that the working volume of the reservoir is substantially zero; and injecting fluid though the opening so as to displace the follower-piston inside the cylinder, and thus increase the working volume of the reservoir that is filled substantially exclusively with fluid.

4. An assembly method according to claim 1, in which the tube, while it is being engaged in the opening, firstly slides without sealing in the opening so as to enable the excess fluid situated in the opening to be forced out around the tube, and secondly becomes engaged in leaktight manner in the opening, in a final assembly position.

5. An assembly method according t6 claim 1, in which the excess fluid that is forced out while the tube is being engaged in the opening is collected in a vented space (23) that communicates with the outside via a passage formed between the dispenser member and reception means (351) in which the dispenser member is received in unsealed engagement.

6. An assembly method according to claim 1, in which the excess fluid that is forced out while the tube is being engaged in the opening is collected in a sealed space (23) that is isolated from the outside by the sealed engagement of the dispenser member in reception means (351).

7. An assembly method according to claim 1, in which the dish (32') is made integrally as a single piece with the cylinder (11').

8. An assembly method according to claim 1, in which the outer periphery (33) of the dish (32) slides in leaktight manner in the cylinder, moving away from the follower-piston while the tube is being engaged in leaktight manner in the opening.

9. The fluid dispenser assembly method according to claim 1, wherein the dispenser member is a pump.

10. A method of assembling a fluid dispenser, comprising:

a dispenser member (2) comprising a body including an inlet tube (22; 61) which internally defines an inlet for admitting fluid into the dispenser member;

a reservoir (10) for containing fluid, said reservoir comprising a cylinder (11; 11') and a follower-piston (14) that is slidably mounted in said cylinder; and an annular dish (32: 32') presenting an outer periphery (33) that is secured to the cylinder (11: 11'), and an inner periphery (321) defining an opening (20) of section that is small relative to the cylinder, the working volume of the reservoir (10) being defined between the dish (32; 32') and the follower-piston (14) over a height of the cylinder, the method including the successive steps of:

filling the reservoir (10) with fluid from the follower-piston up to a certain height in the cylinder;

inserting the dish into the cylinder until the fluid arrives in the opening of the dish;

engaging the tube (22) in leaktight manner in the opening, the engagement of the tube in the opening forcing the excess fluid out of the reservoir, around the tube, until the tube comes into leaktight contact in the opening.

11. An assembly method according to claim 10, in which the tube of the dispenser member is pre-assembled in unsealed manner in the opening of the dish, before the dish is inserted into the cylinder, so as to enable fluid to be forced out between the tube and the opening, the tube coming into its final assembly position in leaktight contact in the opening.

* * * * *